US012565854B2

(12) United States Patent
Klonowski et al.

(10) Patent No.: US 12,565,854 B2
(45) Date of Patent: Mar. 3, 2026

(54) HYBRID PROPULSION TURBOPROP ENGINE COUPLED TO A PROPELLER AND AIRCRAFT COMPRISING SUCH A TURBOPROP ENGINE

(71) Applicant: SAFRAN HELICOPTER ENGINES, Bordes (FR)

(72) Inventors: Thomas Klonowski, Moissy-Cramayel (FR); Lucie Stéphanie Apostin, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 340 days.

(21) Appl. No.: 18/253,081

(22) PCT Filed: Nov. 5, 2021

(86) PCT No.: PCT/FR2021/051962
§ 371 (c)(1),
(2) Date: Aug. 9, 2023

(87) PCT Pub. No.: WO2022/101570
PCT Pub. Date: May 19, 2022

(65) Prior Publication Data
US 2023/0417180 A1 Dec. 28, 2023

(30) Foreign Application Priority Data
Nov. 16, 2020 (FR) ........................................ 2011720

(51) Int. Cl.
F02C 7/32 (2006.01)
F02C 6/20 (2006.01)
F02C 7/06 (2006.01)

(52) U.S. Cl.
CPC ................ F02C 6/206 (2013.01); F02C 7/06 (2013.01); F02C 7/32 (2013.01);
(Continued)

(58) Field of Classification Search
None
See application file for complete search history.

(56) References Cited

U.S. PATENT DOCUMENTS

2005/0279102 A1* 12/2005 O'Connor ............... F02C 7/275
60/788
2011/0030385 A1 2/2011 Ellans et al.
(Continued)

FOREIGN PATENT DOCUMENTS

FR 3057029 A1 4/2018
FR 3061241 A1 6/2018
FR 3073569 A1 5/2019

OTHER PUBLICATIONS

International Search Report for Application No. PCT/FR2021/051962 dated Feb. 23, 2022.
Written Opinion for PCT/FR2021/051962 dated Feb. 23, 2022.

*Primary Examiner* — Phutthiwat Wongwian
*Assistant Examiner* — Jacek Lisowski
(74) *Attorney, Agent, or Firm* — McDonald Hopkins LLC

(57) ABSTRACT

A turbomachine includes a propeller, a propeller shaft carrying the propeller, a rotating electric machine, having at least a first configuration in which it is mechanically coupled to the propeller shaft, and a motor oil pump supplying a lubricating circuit of the turbomachine. The rotating electric machine in the first configuration is mechanically coupled to the motor oil pump in such a way that the rotating electric machine additionally drives the motor oil pump when it is supplied with current. Also disclosed is an aircraft including such a turbomachine.

9 Claims, 3 Drawing Sheets

(52) U.S. Cl.
    CPC .... *F05D 2220/323* (2013.01); *F05D 2220/76*
                (2013.01); *F05D 2260/98* (2013.01)

(56)                    References Cited

U.S. PATENT DOCUMENTS

| | | | |
|---|---|---|---|
| 2015/0000752 A1* | 1/2015 | Matlack | G05D 16/10 |
| | | | 137/12 |
| 2016/0193938 A1* | 7/2016 | Hata | B60K 6/387 |
| | | | 903/910 |
| 2016/0380437 A1* | 12/2016 | Casimir | H02M 7/06 |
| | | | 307/9.1 |
| 2017/0211477 A1* | 7/2017 | Menheere | F02C 7/32 |
| 2017/0321601 A1 | 11/2017 | LaFargue et al. | |
| 2018/0051702 A1* | 2/2018 | Kupiszewski | B64D 33/00 |
| 2019/0085715 A1* | 3/2019 | van der Merwe | F02C 7/32 |
| 2019/0085774 A1* | 3/2019 | Thomassin | F02C 7/26 |
| 2020/0011907 A1* | 1/2020 | Iskanius | H02J 13/00002 |

* cited by examiner

HYBRID PROPULSION TURBOPROP ENGINE COUPLED TO A PROPELLER AND AIRCRAFT COMPRISING SUCH A TURBOPROP ENGINE

TECHNICAL FIELD

The invention relates to the field of turbomachines.

The invention relates more specifically to a turbomachine and an aircraft comprising such a turbomachine.

PRIOR ART

It is known from document US2017/321601 that it is possible to equip aircraft with turbomachines, such as turboprop engines, incorporating a rotating electric machine. Such an electric machine makes it possible to offer both an electricity generating function, in generator mode, to supply the aircraft with electricity, and a propulsion function in the context of ground movements of the aircraft, in particular taxiing type movements.

Thus a turboprop engine in this case comprises a propeller, a propeller shaft supporting the propeller, the rotating electric machine which has at least a first configuration in which it is mechanically coupled to the propeller shaft and enables the rotational drive of the propeller shaft when it is supplied with current.

Nevertheless, the electric propulsion function provided by the electric machine of the turboprop engines proposed by document US2017/321601 is not satisfactory. Indeed, in order to ensure the operation of certain turboprop engine equipment driven by the rotation of the gas turbine, it is necessary to keep the gas turbine running. Thus, the turboprop engines taught by document US2017/321601 do not allow real 100% electric propulsion, as the gas turbine has to be kept running even when the propeller is driven by the rotating electric machine.

DISCLOSURE OF THE INVENTION

The invention aims to remedy this disadvantage and thus aims to provide a turbomachine comprising a rotating electric machine which has a more suitable electric propulsion function.

To achieve this, the invention relates to a turbomachine comprising a propeller, a propeller shaft supporting the propeller, a rotating electric machine, having at least a first configuration in which it is coupled mechanically to the propeller support shaft, and an engine oil pump supplying a lubricating circuit of the turbomachine, the rotating electric machine being capable of rotationally driving the propeller shaft when it is supplied with current in the at least one first configuration.

The rotating electric machine in the first configuration is coupled mechanically to the engine oil pump such that the rotating electric machine additionally drives the engine oil pump when it is supplied with current.

In this way, the lubrication functions and other functions associated with the engine oil pump are retained when the rotating electric machine is in the first configuration and provides electric propulsion to the turbomachine. Likewise, other additional functions provided by the hydraulic force of the oil circuit, such as control of the propeller pitch in the case of a variable pitch propeller, are also functional when electric propulsion is provided in the case of such a turbomachine. Thus, the lubrication functions and these additional functions can be provided when the gas turbine is not operating, the gas turbine does not have to be kept running contrary to the turbomachines of the prior art. As a result, the electric propulsion function enabled by the rotating electric machine according to the invention is particularly suitable.

It should be noted in particular that if such an electric propulsion system is particularly suitable for taxiing type movements, the invention makes it possible to provide such electric propulsion for more demanding movements such as cruise flight.

The turbomachine can be a turboprop engine or a tilt-rotor turboshaft engine, better known as a "proprotor".

It should be noted that the terms "propulsion" by the rotating electric machine, or "electric propulsion", should be understood as "drive" by the rotating electric machine or electric drive, the term propulsion having been selected for simplification purposes since the invention is aimed in particular at turboprop engines for which there is a "propulsion" by the rotating electric machine and "electric propulsion".

The rotating electric machine can be coupled mechanically to the engine oil pump by means of at least a first free wheel.

With such a first free wheel, the engine oil pump can be driven both by the rotating electric machine and by a high-pressure turbine of a gas turbine without any risk of damage, since the movement of the engine oil pump can be decorrelated from that of the rotating electric machine by the first free wheel.

The turbomachine can further comprise a gas turbine comprising a high-pressure turbine, the engine oil pump being mechanically coupled to the high-pressure turbine by means of a second free wheel so as to allow the engine oil pump to be driven both by the rotating electric machine in at least its first configuration and by the high-pressure turbine.

With such a second free wheel, the engine oil pump can be driven by the rotating electric machine without rotating the high-pressure turbine. In this way, the load on the rotating machine is reduced and the power of the rotating electric machine required to rotate the engine oil pump is reduced.

Furthermore, with such first and second free wheels, the engine oil pump can be driven by both the rotating electric machine and the high-pressure turbine and thus ensure proper lubrication of the turbomachine regardless of the source of the propulsion.

The propeller can be a variable pitch propeller and can be connected to the lubrication circuit by a propeller control unit in such a way as to allow the adjustment of the propeller pitch by an oil pressure applied thereto by the propeller control unit.

The turbomachine comprising such a propeller benefits in particular from the invention since the oil pressure provided by the engine oil pump makes it possible to control the propeller pitch even when the gas turbine is switched off and the propulsion is provided by the rotating electrical machine.

The propeller control unit can comprise an additional oil pump for increasing the oil pressure supplied by the engine oil pump and wherein the additional oil pump is mechanically coupled to the propeller shaft such that the rotation of the propeller shaft drives the additional oil pump.

In this way, the additional oil pump is driven by the propeller shaft whether the propulsion is electric or standard.

The turbomachine can be a free turbine, the turbomachine thus further comprising a gas turbine comprising a free turbine, and the propeller shaft being coupled mechanically to the free turbine by means of a third free wheel.

In this way, the propeller shaft can be driven in rotation without the free turbine also being rotated, thereby reducing the power to be provided by the rotating electric machine to rotate the propeller shaft.

The invention further relates to an aircraft comprising a turbomachine according to the invention and at least one DC circuit connected to the rotating electric machine of each turboprop engine by means of an AC/DC converter of said turbomachine.

Such an aircraft benefits from the advantages connected to the turbomachine(s) according to the invention equipped therewith.

The DC circuit can comprise a first low-voltage subcircuit and a second high-voltage subcircuit connected to each other by a DC/DC converter and the AC/DC converter of the or each turboprop engine being connected to the DC circuit by the second subcircuit. The DC/DC converter can comprise a resonant transformer, the DC/DC converter comprising preferably a low-pass filter stage at the interface with the first subcircuit.

It should be noted that above and in the rest of this document, the terms "low voltage" and "high voltage" are relative to one another, the first subcircuit having a functioning voltage, referred to as low voltage, which is lower than that of the second subcircuit, referred to as high voltage.

Such a resonant transformer makes it possible to provide an efficient DC/DC transformation while providing good galvanic isolation.

The second subcircuit can comprise at least one HVDC type battery, the second subcircuit further comprising preferably a DC/DC converter in order to adjust the voltage provided by the HVDC type battery to that of the second subcircuit.

BRIEF DESCRIPTION OF THE DRAWINGS

The present invention is explained further by the description of exemplary embodiments, given purely by way of example and in no way limiting, with reference to the accompanying drawings in which.

Identical, similar or equivalent parts of the various figures bear the same numerical references so as to facilitate the transition from one figure to the other.

The various parts shown in the figures are not necessarily according to a uniform scale, in order to make the figures more readable.

The different options (alternative embodiments and embodiments) should be understood as not being mutually exclusive and can be combined with one another.

DESCRIPTION OF THE EMBODIMENTS

Figure 1:
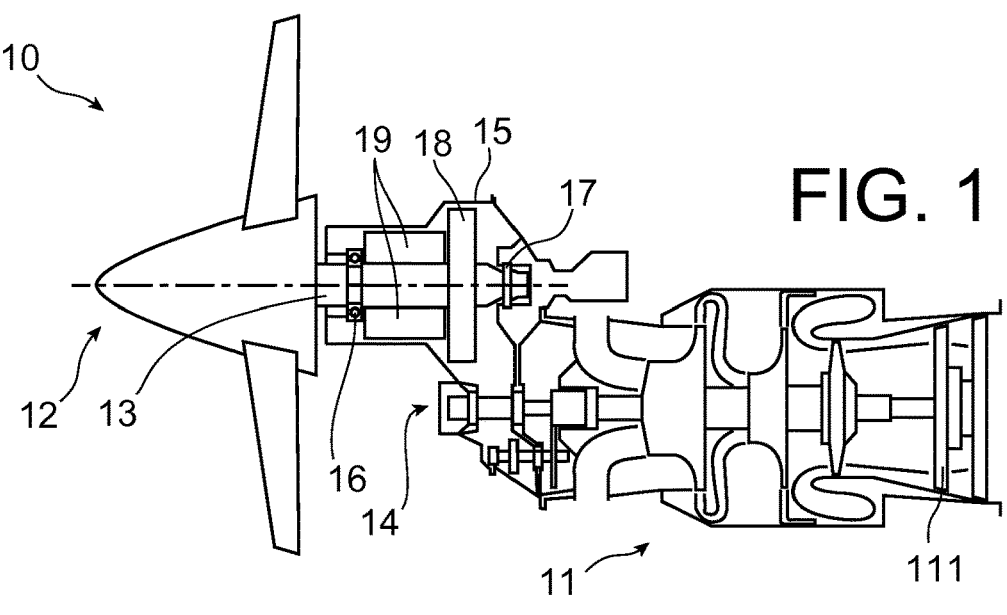
FIG. 1 shows a turbomachine, here a turboprop engine, according to the invention.

FIG. 1 shows a turbomachine, here a turboprop engine 10, according to the invention comprising a rotating electric machine 19 capable of providing a generator function and a propulsion function, particularly in the context of taxiing.

The turbomachine 1 according to this embodiment is a free turbine turboprop engine. Thus a gas turbine 11 comprises, as a result, a high-pressure turbine, not referenced, driving in rotation a turbine shaft 14 and a compressor, not referenced, and a free turbine 111 which drives a secondary shaft, not referenced, of the gas turbine, concentric to the turbine shaft 14.

The turboprop engine 10 thus comprises as shown in FIG. 1, the gas turbine 11, a propeller 12, a propeller shaft 13, extending towards the gas turbine 11 and being coupled, as described here later, to the free turbine 111 by means of a transmission. The free turbine 111 is mounted in rotation about a turbine shaft 14 of the high-pressure turbine. The propeller shaft 13 is surrounded by a protective housing 15. It is supported in the housing 15 by bearings 16 and 17. One of the bearings 16 is close to the propeller 12, and the other bearing 17 is adjacent to a drive gear wheel 18 of the propeller shaft 13, which meshes with the transmission mentioned above. The rotating electric machine 19 is, in this example of the invention, arranged concentrically about the propeller shaft 13, between the first bearing 16 and the gear wheel 18, being surrounded by the housing 15.

Thus, in the present embodiment, the turbomachine is a "standard" turboprop engine. Alternatively, the turbomachine can be a tilt-rotor turbomachine, better known as a "proprotor", which is intended to equip a vertical take-off aircraft known as a "tiltrotor". The turbomachine can thus be both a turboprop engine and a turboengine. The person skilled in the art is of course able to generalise the present teaching described for a "standard" turboprop engine to these other types of turbomachines.

It should be noted that in the present embodiment, the gas turbine 11, being of the free turbine type, provides two drive means for driving the elements of the turboprop engine, the high-pressure turbine and its turbine shaft 14, and the free turbine 111 and its secondary shaft. For more details about the drive kinematics provided by the turbomachine in the present embodiment of the invention, reference is made to the description of FIG. 2.

Of course, it should be noted that while the present configuration of the turboprop engine 10 described above is in accordance with the teaching of document FR 3057029, it is not limited to this one configuration of the rotating electric machine 19 in which the rotating electric machine is arranged to be concentric to the propeller shaft 13. Thus, for example, the present teaching can be easily adapted to a remote configuration as taught by the document US 2017/321601.

It should also be noted that, if the rotating electric machine 19 is, in the context of this embodiment, a simple rotating electric machine capable of proving a generator function and an electric propulsion function, the rotating electric machine 19 may have additional functions, such as that of powering a blade de-icing circuit according to the possibility taught by document US 2019/233128. Indeed, given the similarities between the turboprop engine taught by document FR 3057029 and that taught by document US 2019/233128, the person skilled in the art is perfectly capable of applying the teaching of document US 2019/233128 to the turboprop engine according to the present embodiment. For this purpose, the parts of document US 2019/233128 connected to FIG. 2 corresponding to paragraphs to and FIG. 2 are incorporated by reference into the present document.

Figure 2:
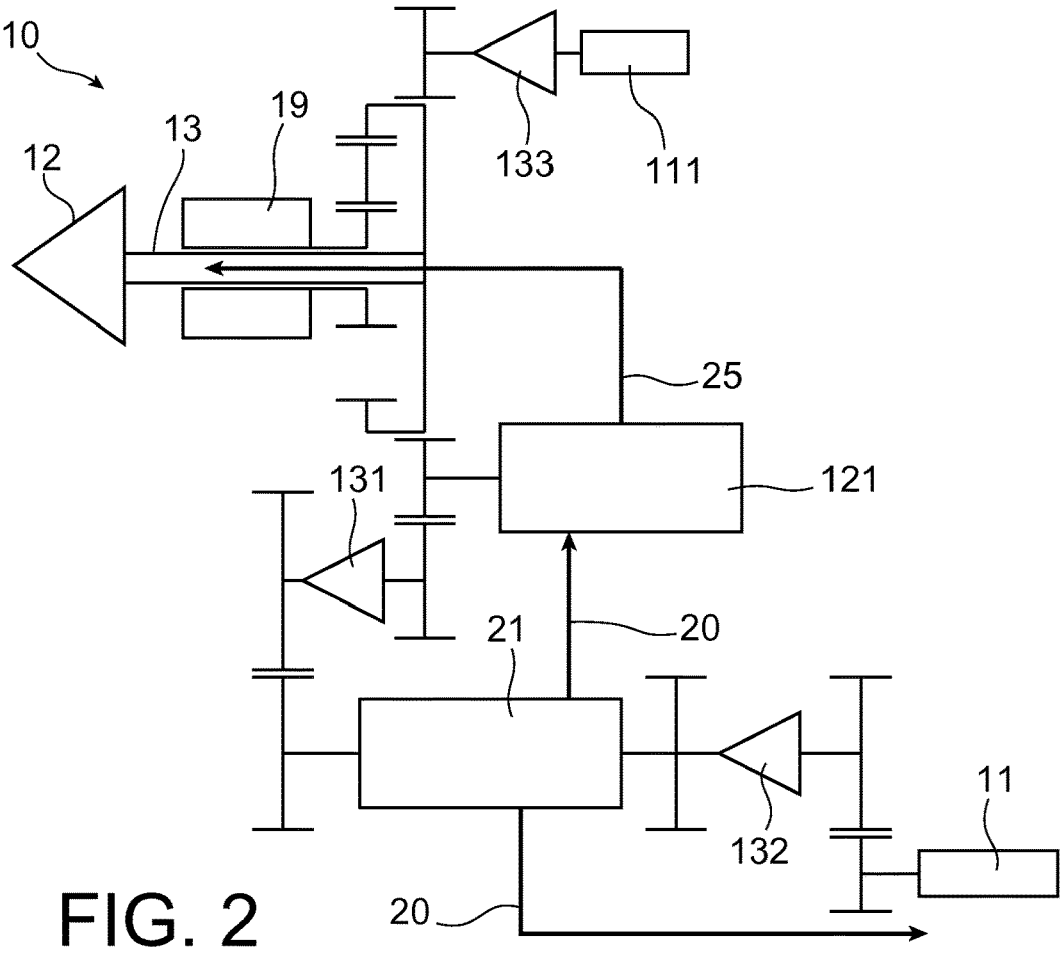
FIG. 2 shows the kinematic diagram of different elements of the turboprop engine according to the invention.

According to the principle of the invention, the rotating electric machine 19 has at least a first configuration in which it is mechanically coupled to the propeller shaft, and the turboprop engine 10 comprises an engine oil pump 21 which, as shown in FIG. 2, supplies a lubricating circuit 20 of the turboprop engine 10. Thus, the rotating electric machine 19 is capable of rotating the propeller shaft 13 when supplied with current in the at least one first configuration. In this same first configuration, the rotating electric machine 19 is coupled mechanically to the engine oil pump 21 such that the rotating electric machine 19 further drives the engine oil pump 21 when powered with current. Thus, when the rotating electric machine 19 is powered with current, the drive of the engine oil pump allows a circulation of oil in the lubricating circuit allowing, in addition to the lubrication of elements of the turboprop engine, such as the bearings and rollers 16 and 17 of the turboprop engine 10, to supply hydraulic pressure to all the equipment of the turbomachine requiring it, such as for example a propeller control unit 121, as described in the following in connection with FIG. 2.

It should be noted that in the context of the invention, the rotating electric machine 19 is preferably a brushless rotating electric machine, for limiting the risks of wear and tear and the maintenance of the turboprop engine 10, and can thus also be a permanent magnet synchronous rotating electric machine as well as a variable reluctance synchronous rotating electric machine, a synchronous machine with a wound rotor or even an asynchronous rotating electric machine.

It is understood, above and in the rest of this document, that by "driving the engine oil pump 21" by the rotating electric machine 19, or any other element of the turboprop engine 10, the engine oil pump 21, which is generally a rotary pump, is set in motion with the rotating electric machine 19, or any other element of the turboprop engine this for example in the case of a rotary pump, by a rotational drive of a shaft of said engine oil pump 21.

In order to illustrate such a mechanical coupling in the first configuration of the rotational electric machine 19 with both the propeller shaft 13 and the engine oil pump 21, an example of a kinetic diagram of these mechanical coupled has been shown in FIG. 2.

Of course, if this kinematic diagram shows these mechanical couplings in the first configuration, in a usual application of the invention, this coupling can be intermittent, the rotational electric machine 19 having a second configuration in which it is decoupled from both the propeller shaft 13 and the engine oil pump 21. Such a coupling/decoupling possibility between the rotating electric machine 19 with the propeller shaft and the engine oil pump 21 can be achieved in accordance with the teaching of document US 2017/321601. Thus the teaching of document US 2017/321601 of selective coupling given in paragraphs to and the associated FIG. 1 is incorporated by reference into the present document.

As illustrated in FIG. 2, in the first configuration, the rotating electric machine 19 is coupled directly to the propeller shaft 13, and thus to the propeller 12 by means of an assembly of gears to achieve speed adjustment between the rotating electric machine 19 and the propeller shaft 13. Of this set of gears, the input gear of the propeller shaft 13 is also coupled to the free turbine 111 of the gas turbine 11, through a third free wheel 133, and to the propeller control unit 121. It should be noted that in order to simplify the kinematic diagram, the free turbine 111 is artificially separated from the gas turbine, since the free turbine 111 is rotationally decoupled from the turbine shaft 14. The propeller control unit 121, and thus the propeller shaft 13 and the rotating electric machine 19, are also mechanically coupled to the engine oil pump 21 via a first free wheel 131. The engine oil pump 21 is also coupled mechanically to the gas turbine 11, or more precisely to the high-pressure turbine and the turbine shaft 14, by means of a second free wheel 132.

With such free wheels 131, 132, 133, it is not necessary to use selective coupling systems when switching from one type of propulsion from the propulsion provided by the gas turbine 11, i.e. by the high-pressure turbine and the free turbine 111, and the propulsion provided by the rotating electric machine 19, to the other type. This simplifies the drive mechanism and thus simplifies the maintenance.

Indeed, it can be seen that when the rotating electric machine 19 is supplied with current, it will be able to rotate the propeller shaft 13 through its input gear. This same input gear drives the propeller control unit 121, and in particular an additional oil pump, not referred to, comprised by the propeller control unit 121, said additional oil pump being capable of raising the oil pressure provided by the engine oil pump 21 through the oil network 20 to allow hydraulic control of the propeller pitch when the latter has a variable pitch through an oil sub-network 25. The drive of the propeller control unit 121 also makes it possible to drive the engine oil pump 21, through the first free wheel 131, to supply oil to the lubricating circuit 20. It should be noted that during such an electric propulsion, the second and third free wheels 132, 133 allow a respective decoupling between the engine oil pump 21 and the turbine shaft 14 and between the propeller shaft 13 and the free turbine. In this way, as the gas turbine components are not driven, the forces to be provided by the rotating electric machine 19 are reduced.

When the propulsion is provided by the gas turbine 11, the turbine shaft 14 allows, according to the usual operation of a turboprop engine, the driving of the engine oil pump 21 through the second free wheel 132. The free turbine 111 drives in turn the propeller shaft 13 by means of the third free wheel 133. This drive of the propeller shaft 13 also allows the propeller control unit to be driven. In the case where the rotating electric machine 19 remains coupled to the propeller shaft 13, the possible selective decoupling not being implemented, it is also driven in rotation by the propeller shaft 13 and can therefore provide an electricity generating function. In this configuration, the first free wheel 131 ensures decoupling between the propeller shaft 13 and the engine oil pump 21 in order to ensure that the latter is driven only by the turbine shaft 14 when the propulsion is provided by the gas turbine 11.

Figure 3:
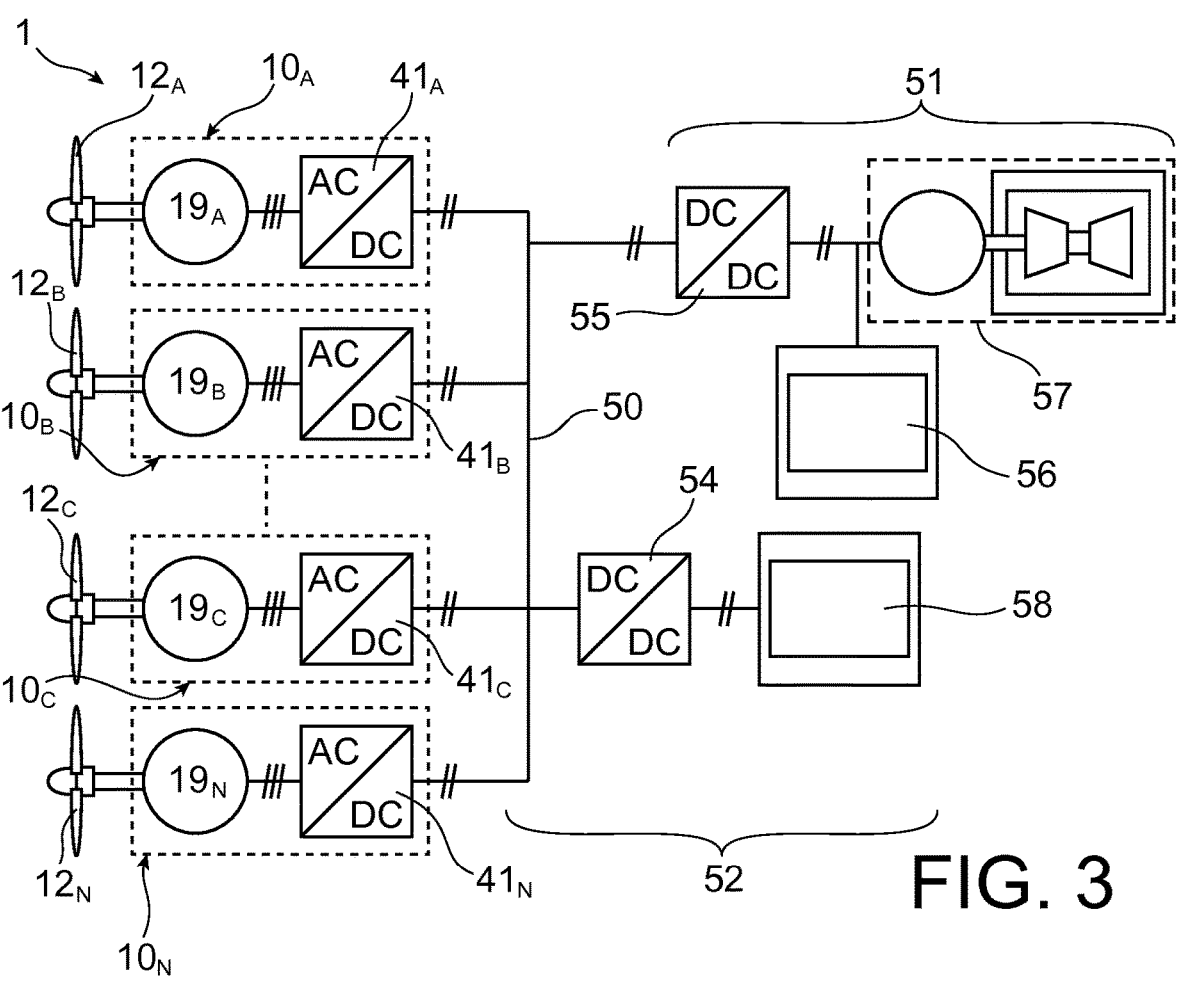
FIG. 3 shows schematically the electric power circuit of an aircraft equipped with a plurality of turboprop engines according to the invention.

To enable such a transition from an electric propulsion function to a generator function, as shown in FIG. 3 which depicts the electric circuit of an aircraft 1 comprising a plurality of turboprop engines $10_A$, $10_B$, $10_C$, $10_N$, the rotating electric machine $19_A$, $19_B$, $19_C$, $19_N$ of each turboprop engine $10_A$, $10_B$, $10_C$, $10_N$ is connected to a DC circuit 50 of the aircraft by means of an AC/DC converter $41_A$, $41_B$, $41_C$, $41_N$ of said turboprop engine $10_A$, $10_B$, $10_C$, $10_N$. The AC/DC converter $41_A$, $41_B$, $41_C$, $41_N$ can be of the inverter type in order to allow a conversion of the DC electric current provided by the DC circuit 50 to the turboprop engine into AC current, when the electric propulsion function is implemented. In the same way, the AC/DC converter $41_A$, $41_B$, $41_C$, $41_N$ can also have a rectifier configuration in order to allow a conversion of the AC electric current supplied by the rotating electric machine 19 to DC current to power the DC circuit, when the generator function of the rotating electric machine 19 is implemented.

According to the convention, here and in the rest of the document, "AC" and "DC" stand for alternating current and direct current. Likewise, "DC current" and "AC current" are understood to mean direct current and alternating current.

According to an advantageous embodiment of the invention shown in FIG. 3, in order to allow a perfectly adjusted power supply to the rotating electric machine $19_A$, $19_B$, $19_C$, $19_N$, the DC circuit 50 can comprise a first low-voltage subcircuit 51 and a second high-tension subcircuit 52 connected to each other by a first DC/DC converter 55. According to this embodiment the AC/DC converter $41_A$, $41_B$, $41_C$, $41_N$ of each turboprop engine 10, $10_A$, $10_B$, $10_C$, $10_N$ is connected to the DC circuit 50 by the second subcircuit 52. In this way, it is possible to supply the various aircraft equipment via a low-voltage according to a usual aircraft configuration, this being generally 28 V, and to use a higher voltage in the case of supplying the various rotating electrical machines $19_A$, $19_B$, $19_C$, $19_N$ in order to optimise the power accessible to the rotating electrical machines $19_A$, $19_B$, $19_C$, $19_N$ in the case of the electrical propulsion function, this voltage being able to be for example equal to or greater than 270 V. According to this option, the second subcircuit 52 forms an HVDC type subcircuit.

Figure 4:
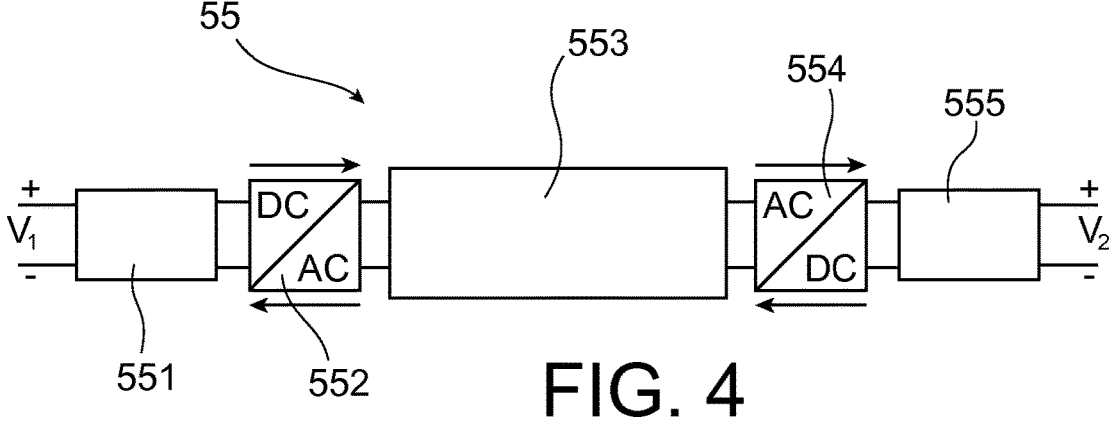
FIG. 4 shows a block diagram of a DC/DC converter as may be used in a supply circuit for an aircraft illustrated in FIG. 3.

The first DC/DC converter 55 is preferably capable of providing galvanic isolation between the first low-voltage subcircuit 51 and the second high-voltage subcircuit 52. According to this option, as illustrated in FIG. 4, the first DC/DC converter 55 can include, starting from the first subcircuit 51 to the second subcircuit 52:

a first filtering stage 551 of the low-pass type, in particular capable of filtering at least in part the frequencies greater than or equal to 1 KHz, a second reversible DC/AC converter stage 552 able to provide both an inverter function, for transferring energy from the first subcircuit 51 to the second subcircuit 52, and a rectifier function, for transferring energy from the second subcircuit 52 to the first subcircuit 51, the second stage being able to provide a high-frequency AC voltage, for example greater than or equal to 1 KHz, a transformer 553 configured to raise the AC voltage supplied by the second stage, the transformer being preferably a resonant transformer, i.e. the resonant frequency of the primary side circuit of the transformer 553 is preferably equal to the resonant frequency of the secondary side circuit of the transformer 553, the second DC/AC converter stage 552 being then preferably configured to supply an AC voltage at a frequency substantially equal to the resonant frequency of the primary and secondary side circuits of the transformer 553, a third reversible AC/DC converter stage 554 being capable of both providing a rectifier function, for transferring energy from the first subcircuit 51 to the second subcircuit 52, and an inverter function for transferring energy from the second subcircuit 52 to the first subcircuit 51, the third stage being capable of supplying an AC voltage of high frequency, for example greater than or equal to 1 KHz, the frequency provided by the third reversible AC/DC converter stage 554 being, in the case where the transformer 553 is a resonant transformer, the third reversible AC/DC converter stage 554 being then preferably configured to supply an AC voltage at a frequency substantially equal to the resonant frequency of the circuits on the primary and secondary side of the transformer 553, a fourth filtering stage 555 of the low-pass type, in particular capable of filtering at least in part frequencies greater than or equal to 1 KHz.

It should be noted that the first and fourth filtering stages 551, 555 are not strictly necessary and that in a simplified configuration of such a first DC/DC converter 55, it is conceivable not to provide any or, in an advantageous manner, to provide only the first filtering stage 551 so as protect the first subcircuit 51.

Figure 5:
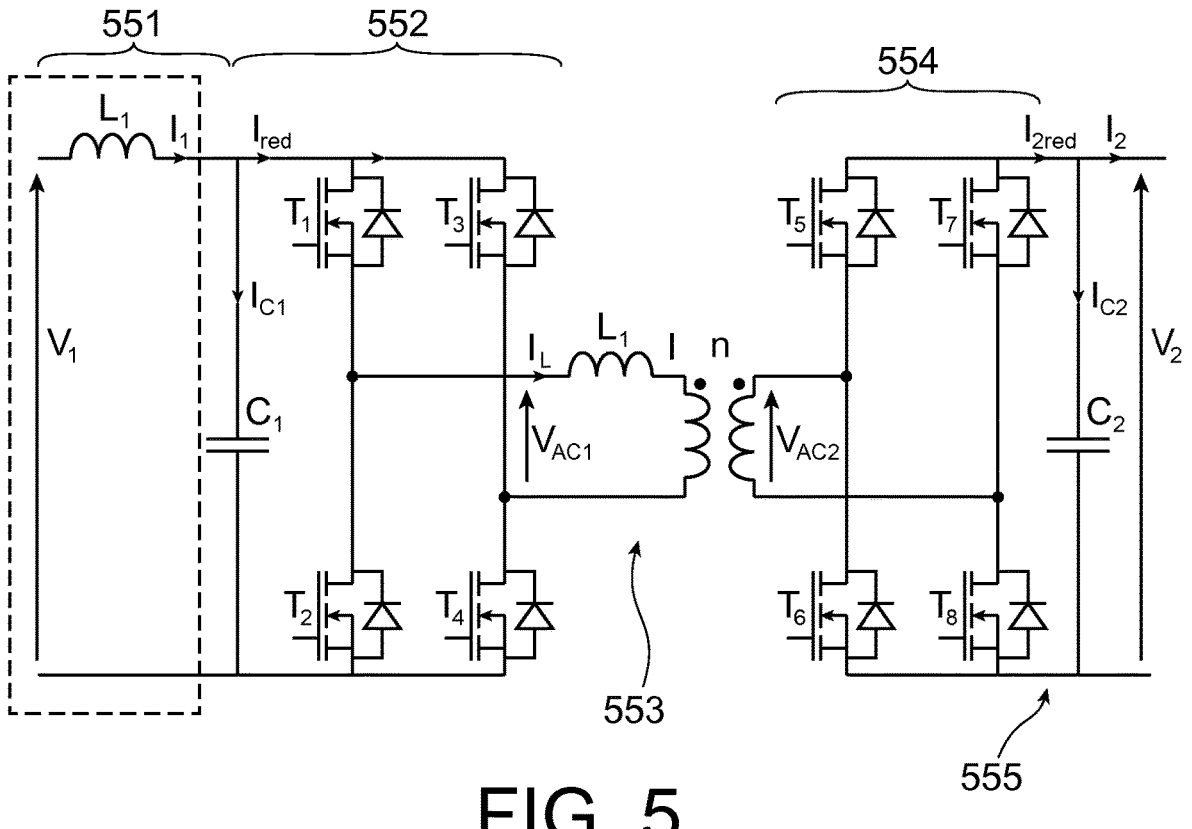
FIG. 5 shows an example of a circuit of a converter as illustrated in FIG. 4.

FIG. 5 illustrates an example of such a DC/DC converter 55 in a resonant configuration. According to this example, the first filtering stage 551 comprises a first coil $L_1$ (current $I_1$) and a capacitor $C_1$ (current $I_{C1}$). The second DC/AC converter stage 552 comprises four transistors T1, T2, T3, T4 configured to connect a first and a second output of the first filtering stage 551 alternately to a first and a second input of the transformer 553 according to a "full bridge" switching. Thus, the second DC/AC converter stage 551 supplies/receives the current $I_{red}$ with the AC voltage $V_{AC1}$. The transformer 553 comprises, in addition to the primary and secondary coils of the transformer, a second coil L 1 so as to equalise the resonant frequencies of the primary and secondary circuit. Thus, the transformer presents/receives at the input of the third reversible AC/DC converter stage 554 an AC voltage $V_{AC2}$. In the same way as the second DC/AC converter stage 552, the first third reversible AC/DC converter stage 554 comprises four transistors T1, T2, T3, T4 configured to connect a first and a second input of the fourth filtering stage 555 alternately to a first and a second output of the transformer 553 respectively according to a "full bridge" switching. The fourth filtering stage 555 thus receives the current $I_{2red}$ and comprises a capacitor $C_2$ (current $I_{C2}$) and allows the supply/recovery of a voltage $V_2$ corresponding to the voltage of the second subcircuit 52 of the DC circuit 50.

Of course, this example of the first DC/DC converter 55 is given by way of example, other converter topographies are perfectly possible without departing from the scope of the invention, the converter preferably having to provide galvanic isolation by means in particular of a transformer which can advantageously be resonant.

According to a usual configuration of an aircraft 1, the first subcircuit 51 can include, in addition to the DC/DC converter 55 which enables its connection to the second subcircuit 52, a conventional battery system 56 enabling the supply to equipment of the aircraft 1 in the absence of current generation and a current generation system 57.

In order to allow a power supply adapted to an electric propulsion, the second subcircuit 52 can further comprise a battery system 58 referred to as an HVDC battery system for providing sufficient electric power to allow a movement of the aircraft 1 by means of the electric propulsion function provided by the rotating electric machines $19_A$, $19_B$, $19_C$, $19_N$. In order to adjust the output voltage of the HVDC battery system 58 to the voltage of the second subcircuit, the second subcircuit can comprise a second DC/DC converter 54. This second DC/DC converter 54 can be buck-boost converter or only a buck or boost converter depending on the expected output voltage range of the HVDC battery system 58.

With such a configuration, the electric rotating machines equipping the turboprop engines allow different configurations of the aircraft including, for example:

a taxiing type of movement on the ground with electric propulsion, movement in flight, particularly in cruise flight, with electric propulsion, generation of electricity, in particular to recharge the HVDC battery system 58, as part of a conventional propulsion provided by the gas turbine 11, the use, in flight, of one or more turboprop engines 10$_A$, 10$_B$, 10$_C$, 10$_N$ as an emergency wind turbine.

What is claimed is:

1. Turbomachine comprising a propeller, a propeller shaft supporting the propeller, a rotating electric machine, having at least a first configuration in which the rotating electric machine is mechanically coupled to the propeller shaft, and an engine oil pump supplying a lubricating circuit of the turbomachine, the rotating electric machine being capable of driving the propeller shaft in rotation when the rotating electric machine is supplied with current in the first configuration, wherein the rotating electric machine in the first configuration is coupled mechanically to the engine oil pump such that the rotating electric machine also drives the engine oil pump when the rotating electric machine is supplied with current, wherein the rotating electric machine is concentric with the propeller shaft, and wherein the rotating electric machine is coupled mechanically to the engine oil pump by means of a first free wheel.

2. Turbomachine according to claim 1, wherein the turbomachine further comprises a gas turbine comprising a high-pressure turbine, and wherein the engine oil pump is mechanically coupled to the high-pressure turbine by means of a second free wheel so as to enable the engine oil pump to be driven both by the rotating electric machine in the first configuration and by the gas turbine.

3. Turbomachine according to claim 1, wherein the propeller is a variable pitch propeller and is connected to the lubricating circuit by a propeller control unit so as to allow adjustment of the propeller pitch from an oil pressure applied to the propeller by the propeller control unit.

4. Turbomachine according to claim 3, wherein the propeller control unit comprises an additional oil pump for raising the oil pressure provided by the engine oil pump and wherein the additional oil pump is coupled mechanically to the propeller shaft in such a way that the rotation of the propeller shaft drives the additional oil pump.

5. Turbomachine according to claim 1, wherein the turbomachine is a free turbine turbomachine, the turbomachine thereby further comprising a gas turbine comprising a free turbine, and wherein the propeller shaft is coupled mechanically to the free turbine by means of a third free wheel.

6. Aircraft (1) comprising at least one said turbomachine according to claim 1 and at least one DC circuit connected to the rotating electric machine of the at least one turbomachine by means of an AC/DC converter of said turbomachine.

7. Aircraft according to claim 6, wherein the at least one DC circuit comprises a first low-voltage subcircuit and a second high-voltage subcircuit connected to one another by a DC/DC converter and wherein the AC/DC converter of said turbomachine is connected to the at least one DC circuit by the second subcircuit.

8. Aircraft according to claim 7, wherein the DC/DC converter comprises a resonant transformer, and a low-pass filter stage at an interface with the first subcircuit.

9. Aircraft according to claim 7, wherein the second subcircuit comprises at least one HVDC type battery, the second subcircuit preferably further comprising another DC/DC converter in order to adjust a voltage delivered by the at least one HVDC type battery to that of the second subcircuit.

* * * * *